United States Patent
Tsujii

(10) Patent No.: US 9,298,906 B2
(45) Date of Patent: Mar. 29, 2016

(54) ANALYZING APPARATUS VALIDATING SYSTEM AND PROGRAM FOR THE SYSTEM

(71) Applicant: SHIMADZU CORPORATION, Kyoto-shi, Kyoto (JP)

(72) Inventor: Kanya Tsujii, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 38 days.

(21) Appl. No.: 13/949,759

(22) Filed: Jul. 24, 2013

(65) Prior Publication Data

US 2014/0041059 A1 Feb. 6, 2014

(30) Foreign Application Priority Data

Jul. 31, 2012 (JP) ................................ 2012-169483

(51) Int. Cl.
G06F 21/44 (2013.01)
G06Q 50/04 (2012.01)

(52) U.S. Cl.
CPC ................ *G06F 21/44* (2013.01); *G06Q 50/04* (2013.01); *Y02P 90/30* (2015.11)

(58) Field of Classification Search
USPC ........... 726/30; 324/754.23; 355/55; 717/137
See application file for complete search history.

(56) References Cited

U.S. PATENT DOCUMENTS

2005/0193262 A1* 9/2005 Osaka et al. .................... 714/37
2007/0027648 A1* 2/2007 Kowata ........................... 702/84

FOREIGN PATENT DOCUMENTS

JP 2005-283332 A 10/2005
JP 2007-101564 A 4/2007

OTHER PUBLICATIONS

Communication from Chinese Patent Office issued Feb. 2, 2015 in counterpart Chinese Patent Application No. 201310329184.1.
Guidance for Industry, Bioanalytical Method Validation, U.S. Department of Health and Human Services Food and Drug Administration, Center for Drug Evaluation and Research (CDER), Center for Veterinary Medicine (CVM), May 2001, BP.
Communication dated Aug. 18, 2015 from the Japanese Patent Office in counterpart application No. 2012-169483.
Chinese Second Office Action corresponding to Chinese Patent Application No. 201310329184.1, dated Sep. 16, 2015.
Analytical Instrument, Equipment Verification and Computer System Verification, Li Hongye, Baidu Wenku: http://wenku.baidu.com/view/e3fc432fcfc789eb162dc807.html, accessed Apr. 11, 2012, pp. 1-76.

* cited by examiner

*Primary Examiner* — Jeffrey Pwu
*Assistant Examiner* — Samuel Ambaye
(74) *Attorney, Agent, or Firm* — Sughrue Mion, PLLC

(57) ABSTRACT

In validation of an analyzing apparatus, in the case where the system configuration is not standard or where a reference value required for the validation is different from a standard value, the validation work cannot be automatically performed, which requires time and effort. For a validation target analyzing apparatus system, first, a parameter acquiring unit acquires parameters for qualification implementation of the analyzing apparatus system on a basis of an electronically supplied qualification plan document and an electronically supplied qualification implementation procedure manual. Then, a validation executing unit executes validation of the analyzing apparatus system using the acquired parameters for qualification implementation.

4 Claims, 4 Drawing Sheets

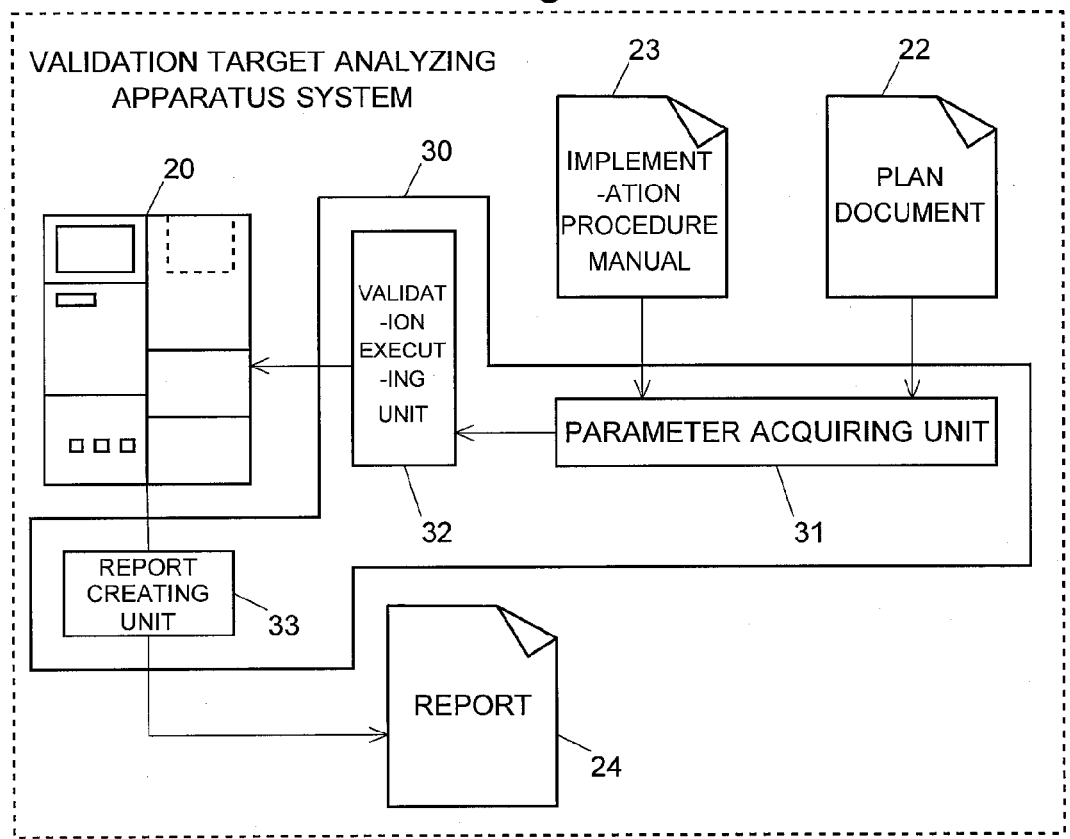
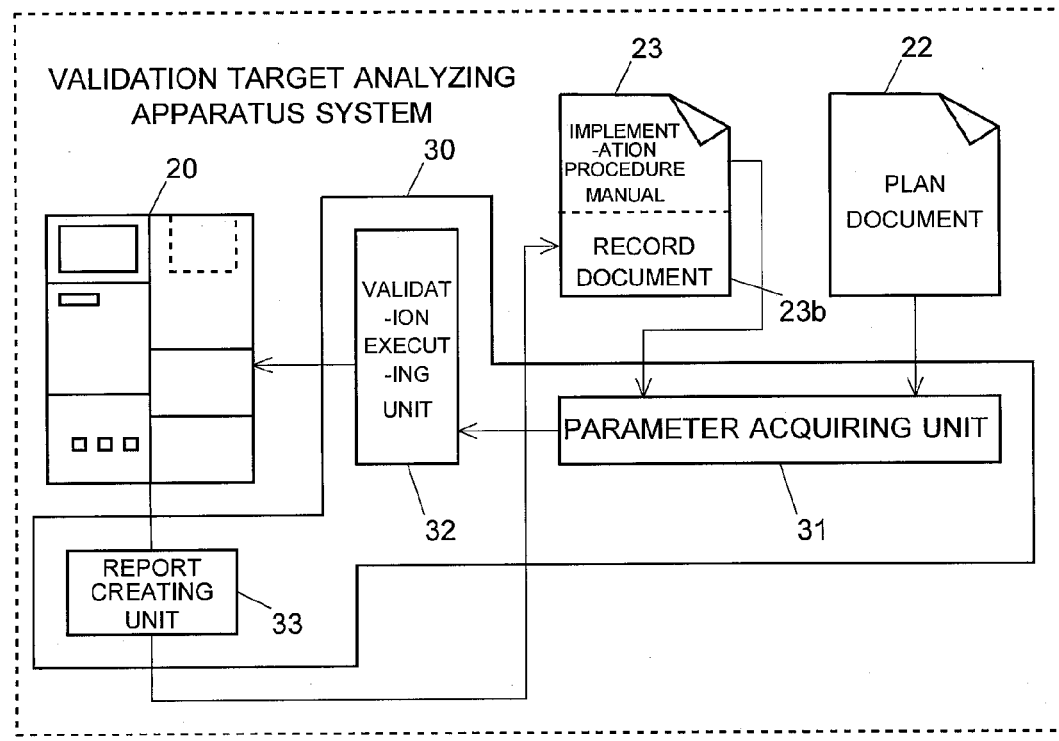

ANALYZING APPARATUS VALIDATING SYSTEM AND PROGRAM FOR THE SYSTEM

TECHNICAL FIELD

The present invention relates to a validating system for analyzing apparatuses such as an infrared spectrophotometer, an ultraviolet-visible spectrophotometer, and a chromatograph. The present invention also relates to a program for the validating system.

BACKGROUND ART

In recent years, in fields of food inspection, development and evaluation of new medicines, and the like, guidelines called good laboratory practice (GLP) and good manufacturing practice (GMP) have been introduced in order to secure the reliability of measurement results. In GLP/GMP, strict guidelines are provided for management of data containing setting conditions and results of examination and inspection, and the validity of an analyzing apparatus or an analyzing system itself used for measurement is required to be proved. Then, in order to enable objective evaluation of the validity thereof, the entire activity from planning to implementation of an analysis is required to be documented.

Examples of the adopted methods for proving the validity of an analyzing apparatus include installation qualification (IQ), operational qualification (OQ), and performance qualification (PQ). The installation qualification (IQ) is intended to check whether the analyzing apparatus is installed as designed or as defined in its specifications and under appropriate environments. Further, the operational qualification (OQ) and the performance qualification (PQ) are intended to check, through various examinations, whether the installed apparatus satisfies required performance.

For example, the operational qualification (OQ) is implemented in the following procedures (FIG. 1). First, a user requests an analyzing apparatus manufacturer to do validation work. The apparatus manufacturer which has received this request creates a qualification plan document. The apparatus manufacturer prepares in advance standard instructions 11 of plan documents and implementation procedure manuals for such qualification, with regard to various units used for an analyzing apparatus. The apparatus manufacturer that has received the request from the user selects, from among the various standard instructions, a basic plan document 12 and an implementation basic procedure manual 13 matched with an analyzing apparatus system 10 supplied to the user.

The analyzing apparatus 10 supplied to the user may be used without any change, and the apparatus configuration may be changed so as to suit an intended analysis purpose of the user. Further, qualification parameters and qualification reference values are generally different for each user.

Accordingly, the user and the apparatus manufacturer consult with each other, whereby a qualification plan document 22 and a qualification implementation procedure manual 23 corresponding to validation work to be done this time are created on the basis of the basic plan document 12 and the implementation basic procedure manual 13 corresponding to a general analyzing apparatus system 10, general qualification parameters, and general qualification reference values. A validation worker of the user (or the apparatus manufacturer) implements qualification examination (validation) of a validation target analyzing apparatus 20 on the basis of the qualification implementation procedure manual 23 thus created. Examination results are documented as a report concerning the qualification, are checked and approved also by the user, and are stored as a result document.

In validation work on an analyzing apparatus, the apparatus is manually operated one by one, and hence such validation work requires enormous time and effort. In view of this, systems for supporting such work have been developed up to now. For example, a system described in Patent Document 1 achieves power saving and automation of validation work concerning a calculation function and a report output function of an analyzing apparatus.

BACKGROUND ART DOCUMENT

Patent Document

[Patent Document 1] JP-A 2005-283332

DISCLOSURE OF THE INVENTION

Problem to be Solved by the Invention

With the utilization of such a system for supporting validation work as described in Patent Document 1, burdens on a worker can be reduced, and the time required for the work can be shortened. In the case where the system configuration of an analyzing apparatus is determined in advance, the validation work can be automated. Meanwhile, in the case as described above where the system configuration is changed from a standard configuration or where a reference value required for the validation is different from a standard value, a validation worker still needs to manually execute qualification examination.

Means for Solving the Problem

The present invention, which has been made in order to solve the aforementioned problem, provides an analyzing apparatus validating system that executes validation of an analyzing apparatus system, including:

a parameter acquiring unit acquiring a parameter for qualification implementation of the analyzing apparatus system, from an electronically supplied qualification plan document and an electronically supplied qualification implementation procedure manual of the analyzing apparatus system; and a validation executing unit executing the validation of the analyzing apparatus system using the acquired parameter for qualification implementation.

The present invention can also be carried out in the form of a program for an analyzing apparatus validating system that executes validation of an analyzing apparatus system. The program causes a computer to function as:

a parameter acquiring unit acquiring a parameter for qualification implementation of the analyzing apparatus system, from an electronically supplied qualification plan document and an electronically supplied qualification implementation procedure manual of the analyzing apparatus system; and a validation executing unit executing the validation of the analyzing apparatus system using the acquired parameter for qualification implementation.

Effects of the Invention

In the analyzing apparatus validating system according to the present invention, validation of an analyzing apparatus or an analyzing apparatus system (in the present invention, these are collectively referred to as analyzing apparatus system) is performed in the following procedures (FIG. 2). First, for an analyzing apparatus system 20, a parameter acquiring unit 31 acquires various parameters for qualification implementation on the basis of a qualification plan document 22 and a qualification implementation procedure manual 23 that are determined in advance through consultation or the like. The parameters for qualification implementation include: data concerning the configuration of the target analyzing apparatus system 20; qualification parameters; and qualification reference values. A validation executing unit 32 executes validation of the analyzing apparatus system 20 using the acquired parameters for qualification implementation.

In this way, in the analyzing apparatus validating system according to the present invention, validation work is automatically performed on the basis of data that reflects the system configuration of a validation target analyzing apparatus and reflects qualification parameters and qualification reference values desired by a user. That is, validation can be automatically executed for any type of analyzing apparatus system.

As a result, for example, in the case where there is a plurality of validation target analyzing apparatuses, validation work on the plurality of analyzing apparatuses can be simultaneously executed in parallel. Accordingly, the working time can be significantly shortened as compared with conventional cases that require manual work for each step.

BRIEF DESCRIPTION OF THE DRAWINGS

FIG. 4 is a conceptual diagram of an operation in a second embodiment of the analyzing apparatus validating system according to the present invention.

FIG. 5 is a conceptual diagram of an operation in a third embodiment of the analyzing apparatus validating system according to the present invention.

BEST MODES FOR CARRYING OUT THE INVENTION

Hereinafter, embodiments of an analyzing apparatus validating system according to the present invention are described in detail with reference to the drawings.

First Embodiment

Figure 1:
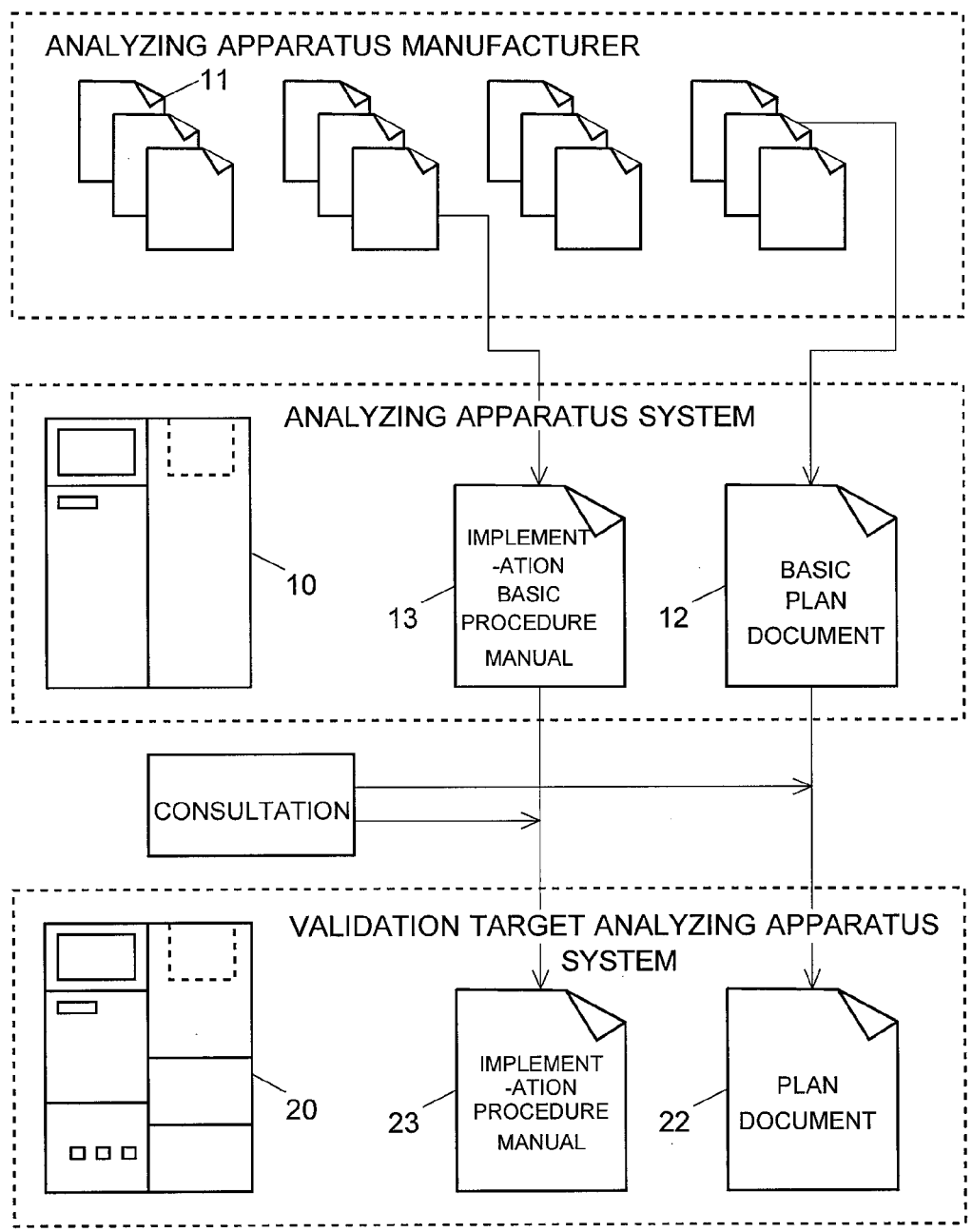
FIG. 1 is a conceptual diagram of general procedures for validation work on an analyzing apparatus.
Figure 2:
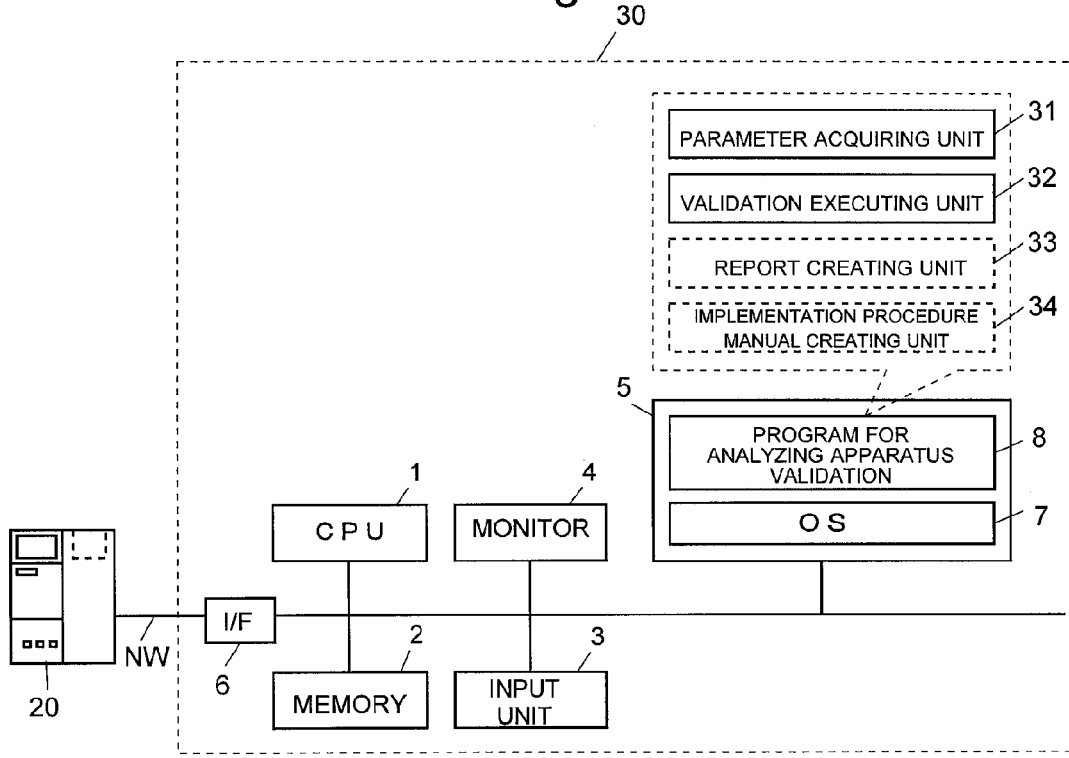
FIG. 2 is a diagram showing a schematic configuration of an embodiment of an analyzing apparatus validating system according to the present invention.

FIG. 2 shows a schematic configuration of an embodiment of an analyzing apparatus validating system 30 (hereinafter, abbreviated as "system 30" as appropriate) according to the present invention. In the present embodiment, the system 30 is connected to an analyzing apparatus 20 that is, for example, a chromatograph. The reality of the system 30 is a computer. A memory 2, an input unit 3 including a keyboard and a mouse, a monitor (display unit) 4 including a liquid crystal display (LCD), and a storage unit 5 including a mass storage such as a hard disk or a solid state drive (SSD) are connected to a central processing unit (CPU) 1.

The storage unit 5 stores therein a program for analyzing apparatus validation 8. When the CPU 1 executes the program for analyzing apparatus validation 8, a validation process that corresponds to a target analyzing apparatus 20 and is matched with an intended validation purpose of this time is executed. The storage unit 5 stores therein an operating system (OS) 7 and the program for analyzing apparatus validation 8 running on the OS 7.

The system 30 includes an interface (I/F) 6 that serves for direct connection with an external apparatus using, for example, a universal serial bus (USB) and for connection with an external apparatus via a network such as a local area network (LAN). The system 30 is connected by the I/F 6 to the validation target analyzing apparatus 20 via a network cable NW.

Figure 3:
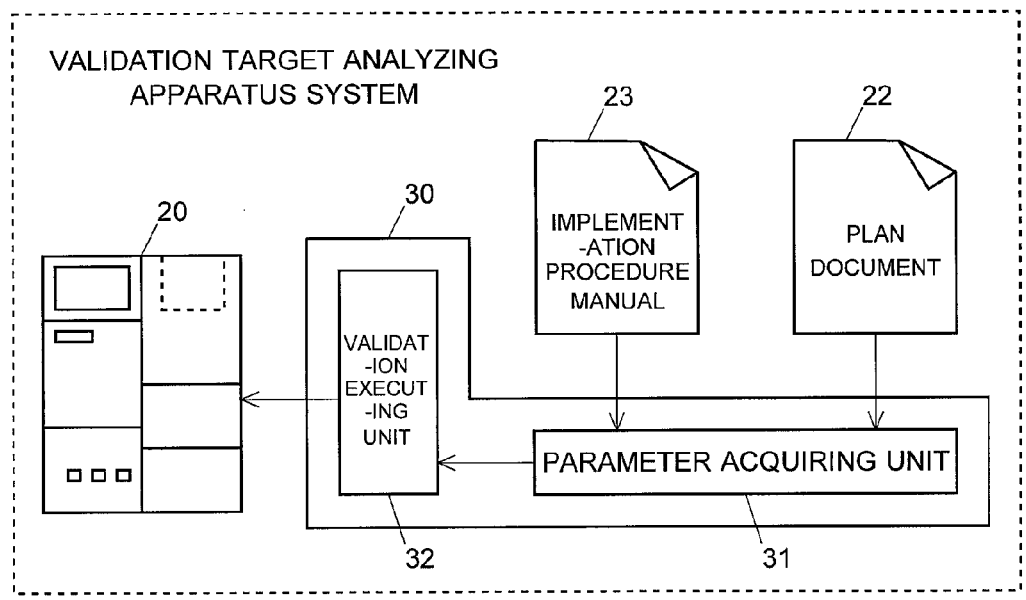
FIG. 3 is a conceptual diagram of an operation in a first embodiment of the analyzing apparatus validating system according to the present invention.

As shown in FIG. 3, such a qualification plan document 22 and a qualification implementation procedure manual 23 as described above are provided as electronic files to the system 30. As described before, the apparatus manufacturer and a user of the analyzing apparatus 20 consult with each other and modify a qualification basic plan document 12 and a qualification implementation basic procedure manual 13 prepared by the apparatus manufacturer so as to suit an intended validation purpose of this time. and create the qualification plan document 22 and the qualification implementation procedure manual 23. That is, the qualification plan document 22 and the qualification implementation procedure manual 23 correspond to the validation target analyzing apparatus 20, and reflect the apparatus configuration as well as parameters and reference values suited to the intended validation purpose (the qualification plan document 22 and the qualification implementation procedure manual 23 each include data concerning the apparatus configuration, the parameters, and the reference values).

The qualification plan document 22 and the qualification implementation procedure manual 23 may be stored in a local environment such as the storage unit 5 in the system 30, and may be stored in an external location accessible from the system 30. The qualification plan document 22 and the qualification implementation procedure manual 23 may be provided in any file format and any data format as long as the adopted formats are readable (and writable) by the computer. Examples of the adopted formats include Portable Document Format (PDF), Hyper Text Markup Language (HTML), and a text format.

Further, in FIG. 2, a parameter acquiring unit 31, a validation executing unit 32, a report creating unit 33, and an implementation procedure manual creating unit 34 are shown in connection with the program for analyzing apparatus validation 8. Basically, these units are implemented in the form of software by the CPU 1 executing the program for analyzing apparatus validation 8. Note that the report creating unit 33 and the implementation procedure manual creating unit 34 are not essential components in the present embodiment, and are described later in other embodiments.

Hereinafter, with reference to FIG. 2 and FIG. 3, description is given of an operation example in which validation work on the analyzing apparatus 20 is executed using the analyzing apparatus validating system 30 according to the present invention.

A worker operates the input unit 3 of the system 30 as appropriate, to thereby input an instruction to execute validation of the analyzing apparatus 20. Then, the parameter acquiring unit 31 accesses the qualification plan document 22 and the qualification implementation procedure manual 23, and extracts (acquires), therefrom, parameters for qualification implementation including data concerning the configuration of the analyzing apparatus 20 as well as qualification parameters and qualification reference values suited to an intended purpose of this validation.

Next, the validation executing unit 32 executes the validation of the analyzing apparatus system 20 on the basis of the parameters for qualification implementation thus acquired.

Second Embodiment

As shown in FIG. 4, the analyzing apparatus validating system 30 may include the report creating unit 33. In this case, upon the reception of an instruction from the worker or at the timing of a validation end, the report creating unit 33 creates, in a predetermined format, a qualification report 24 showing validation results of the analyzing apparatus 20 on the basis of the validation results obtained by executing the validation. This report may include evaluation (judgment of acceptance) based on a predetermined criterion, in addition to the examination results. The created qualification report 24 is checked by a user and a manufacturer, and is printed out or stored in a predetermined storage area.

Third Embodiment

As shown in FIG. 5, the qualification implementation procedure manual 23 may include a record document 23b in which validation results are described. In this case, the report creating unit 33 immediately describes (outputs) qualification results obtained by executing items in the qualification implementation procedure manual 23, into the record document 23b.

Fourth Embodiment

In all the above-mentioned embodiments, the qualification implementation procedure manual 23 is created in advance by consultation between a user and an apparatus manufacturer. Alternatively, the qualification implementation procedure manual 23 itself may be created by the system 30. That is, the user and the manufacturer consult with each other about the qualification basic plan document 12 created for a standard analyzing apparatus 10, whereby the qualification plan document 22 matched with the validation target analyzing apparatus 20 is first created.

Figure 6:
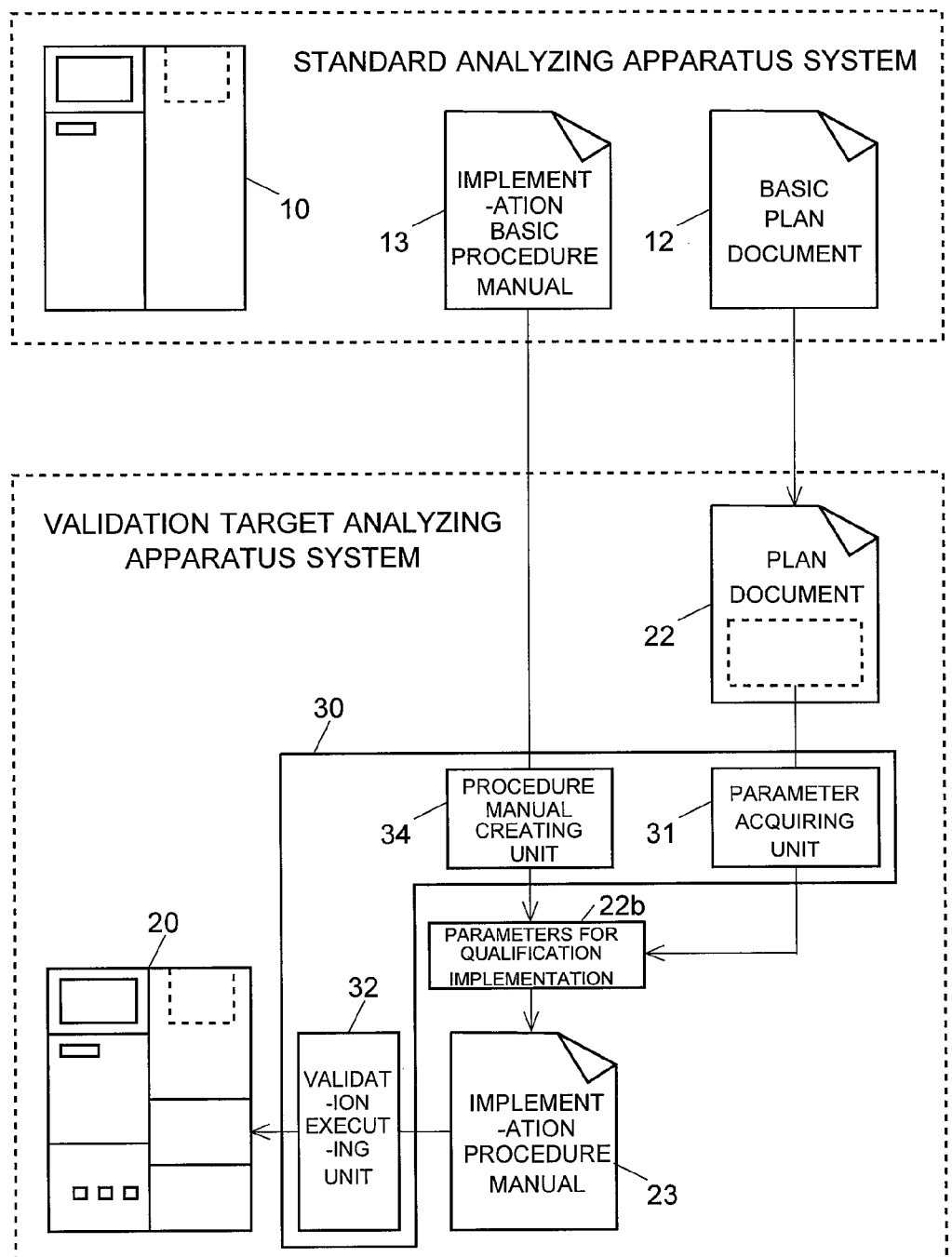
FIG. 6 is a conceptual diagram of an operation in a fourth embodiment of the analyzing apparatus validating system according to the present invention.

As shown in FIG. 6, in the analyzing apparatus validating system 30 according to the present embodiment, the qualification implementation procedure manual 23 corresponding to the analyzing apparatus 20 is created on the basis of: the qualification plan document 22 that is created as described above and corresponds to the analyzing apparatus 20; and the qualification implementation basic procedure manual 13 created correspondingly to the standard analyzing apparatus 10. That is, the parameter acquiring unit 31 takes parameters for qualification implementation 22b out of the supplied qualification plan document 22, and the procedure manual creating unit 34 reflects these parameters in the qualification implementation basic procedure manual 13 created correspondingly to the standard analyzing apparatus 10, whereby the qualification implementation procedure manual 23 matched with the target analyzing apparatus 20 of this time is created.

EXPLANATION OF NUMERALS

1 . . . CPU
2 . . . Memory
3 . . . Input Unit
4 . . . Monitor
5 . . . Storage Unit
6 . . . I/F
7 . . . OS
8 . . . Program for Analyzing Apparatus Validation
10 . . . Standard Analyzing Apparatus
20 . . . Validation Target Analyzing Apparatus
11 . . . Standard Instructions of Plan Documents and Procedure Manuals
12 . . . Qualification Basic Plan Document
13 . . . Qualification Implementation Basic Procedure Manual
22 . . . Qualification Plan Document
23 . . . Qualification Implementation Procedure Manual
30 . . . Analyzing Apparatus Validating System
31 . . . Parameter Acquiring Unit
32 . . . Validation Executing Unit
33 . . . Report Creating Unit
34 . . . Procedure Manual Creating Unit

The invention claimed is:

1. An analyzing apparatus validating system that executes validation of an analyzing apparatus system, the analyzing apparatus validating system comprising a computer comprising:
a parameter acquiring unit acquiring a parameter for qualification implementation of the analyzing apparatus system from an electronically supplied qualification plan document describing a qualification plan and an electronically supplied qualification implementation procedure manual of the analyzing apparatus system describing a qualification implementation procedure, both the electronically supplied qualification plan document and the electronically supplied qualification implementation procedure manual being prepared by an apparatus manufacturer and a user;
a validation executing unit executing the validation of the analyzing apparatus system using the acquired parameter for qualification implementation; and
a report creating unit creating, in a predetermined format, a qualification report of the analyzing apparatus system on a basis of a validation result obtained by executing the validation.

2. An analyzing apparatus validating system that executes validation of an analyzing apparatus system, the analyzing apparatus validating system comprising a computer comprising:
a parameter acquiring unit acquiring a parameter for qualification implementation from an electronically supplied qualification basic plan document describing a qualification basic plan, the electronically supplied qualification basic plan document being prepared by an apparatus manufacturer;
a procedure manual creating unit adding the parameter for qualification implementation to an electronically supplied qualification implementation basic procedure manual describing a qualification implementation basic procedure, the electronically supplied qualification implementation basic procedure manual being prepared by the apparatus manufacturer, to thereby create a qualification implementation procedure manual describing a qualification implementation procedure; and
a validation executing unit executing the validation of the analyzing apparatus system on a basis of the created qualification implementation procedure manual.

3. A non-transitory computer readable medium recording a program for an analyzing apparatus validating system that executes validation of an analyzing apparatus system, the program causing a computer to function as:

a parameter acquiring unit acquiring a parameter for qualification implementation of the analyzing apparatus system from an electronically supplied qualification plan document describing a qualification plan and an electronically supplied qualification implementation procedure manual of the analyzing apparatus system describing a qualification implementation procedure, both the electronically supplied qualification plan document and the electronically supplied qualification implementation procedure manual being prepared by an apparatus manufacturer and a user;

a validation executing unit executing the validation of the analyzing apparatus system using the acquired parameter for qualification implementation; and a report creating unit creating, in a predetermined format, a qualification report of the analyzing apparatus system on a basis of a validation result obtained by executing the validation.

4. A non-transitory computer readable medium recording a program for an analyzing apparatus validating system that executes validation of an analyzing apparatus system, the program causing a computer to function as:

a parameter acquiring unit acquiring a parameter for qualification implementation from an electronically supplied qualification basic plan document describing a qualification basic plan, the electronically supplied qualification basic plan document being prepared by an apparatus manufacturer;

a procedure manual creating unit adding the parameter for qualification implementation to an electronically supplied qualification implementation basic procedure manual describing a qualification implementation basic procedure, the electronically supplied qualification implementation basic procedure manual being prepared by the apparatus manufacturer, to thereby create a qualification implementation procedure manual describing a qualification implementation procedure; and a validation executing unit executing the validation of the analyzing apparatus system on a basis of the created qualification implementation procedure manual.

\* \* \* \* \*